(12) United States Patent
Takeuchi et al.

(10) Patent No.: US 9,248,488 B2
(45) Date of Patent: Feb. 2, 2016

(54) BENDING DIE, AND APPARATUS AND METHOD FOR MANUFACTURING AUTOMOTIVE SUSPENSION ARM USING THE SAME

(75) Inventors: Koji Takeuchi, Inabe (JP); Masashi Nakano, Inabe (JP); Chihiro Kitamoto, Inabe (JP); Shunsuke Suzuki, Inabe (JP); Hirotoshi Hamada, Inabe (JP)

(73) Assignee: Kobe Steel, Ltd., Kobe-shi (JP)

( * ) Notice: Subject to any disclaimer, the term of this patent is extended or adjusted under 35 U.S.C. 154(b) by 1224 days.

(21) Appl. No.: 13/109,164

(22) Filed: May 17, 2011

(65) Prior Publication Data

US 2011/0302984 A1 Dec. 15, 2011

(30) Foreign Application Priority Data

Jun. 10, 2010 (JP) .................................. 2010-132572

(51) Int. Cl.
*B21D 22/02* (2006.01)
*B21D 53/88* (2006.01)
(Continued)

(52) U.S. Cl.
CPC .............. *B21D 22/02* (2013.01); *B21D 53/88* (2013.01); *B21J 1/04* (2013.01); *B21J 9/022* (2013.01); *B21J 13/02* (2013.01); *B21K 1/74* (2013.01);
(Continued)

(58) Field of Classification Search
CPC ............ Y10T 29/5116; Y10T 29/5124; Y10T 29/5196; B21D 7/00; B21D 7/04; B21D 11/02; B21D 22/02; B21D 22/025; B21D 53/88; B21J 1/04; B21J 9/022; B21J 9/06; B21J 9/02; B21J 13/02; B21K 1/74; B21K 7/12
USPC ......................................... 72/213, 369, 389.1
See application file for complete search history.

(56) References Cited

U.S. PATENT DOCUMENTS 6,678,574 B2 * 1/2004 Fujii et al. ....................... 72/340
7,251,979 B2 * 8/2007 Sakuragi et al. ................ 72/340
8,127,449 B2 * 3/2012 Bayer et al. ..................... 72/339

FOREIGN PATENT DOCUMENTS

CN 101020210 A 8/2007
CN 202185512 U 4/2012
(Continued)

OTHER PUBLICATIONS

Combined Chinese Office Action and Search Report issued Jun. 28, 2013, in Patent Application No. 201110132487.5 (with English-language translation).

*Primary Examiner* — Shelley Self
*Assistant Examiner* — Pradeep C Battula
(74) *Attorney, Agent, or Firm* — Oblon, McClelland, Maier & Neustadt, L.L.P.

(57) ABSTRACT

A bending die used in the apparatus for manufacturing the automotive suspension arm to bend a rod-like raw material and produce a bent material includes a lower bending die including a mounting portion for mounting thereon the rod-like raw material and an upper bending die including a pressing portion for vertically pressing the rod-like raw material mounted on the lower bending die. The mounting portion and the pressing portion include a lower die contact portion and an upper die contact portion each formed into a shape along the bent shape of the bent material to come in contact with the bent material. The lower die contact portion includes, in the middle portion thereof, a groove portion formed to have a size which allows a moving means to grip the bent material in non-contact relation with the bent material.

13 Claims, 8 Drawing Sheets

(51) Int. Cl.
*B21J 1/04* (2006.01)
*B21J 9/02* (2006.01)
*B21J 13/02* (2006.01)
*B21K 1/74* (2006.01)
*B21K 27/04* (2006.01)
*B23P 15/00* (2006.01)
*B60G 7/00* (2006.01)
B23P 23/06 (2006.01)

(52) U.S. Cl.
CPC ................. *B21K 27/04* (2013.01); *B23P 15/00* (2013.01); *B60G 7/001* (2013.01); *B23P 23/06* (2013.01); *B23P 2700/14* (2013.01); *B60G 2206/122* (2013.01); *B60G 2206/81022* (2013.01); *B60G 2206/83* (2013.01)

(56) References Cited

FOREIGN PATENT DOCUMENTS

JP         03-068942 U      7/1991
JP         6-530 U          1/1994

* cited by examiner

BENDING DIE, AND APPARATUS AND METHOD FOR MANUFACTURING AUTOMOTIVE SUSPENSION ARM USING THE SAME

FIELD OF THE INVENTION

The present invention relates to a bending die used in an apparatus for manufacturing an automotive suspension arm, and the apparatus and method for manufacturing the automotive suspension arm using the bending die.

BACKGROUND OF THE INVENTION

Conventionally, an automotive suspension arm is manufactured by bust forging and finish forging or by bust forging, rough forging, and finish forging. In addition, in a manufacturing apparatus therefor, the transportation of members between individual forging steps is generally performed with a transfer feeder. As an example of the manufacturing apparatus including the transfer feeder, a manufacturing apparatus having a structure as shown below is described in Japanese Unexamined Utility Model Application Publication No. Hei 06(1994)-530.

The manufacturing apparatus includes a forging device in which an upset die, a rough finishing die, a finishing die, and a blanking die are juxtaposed, and a transfer feeder which is disposed over a lower die holder having the lower dies of the individual dies being disposed thereon and in which gripping claws are disposed in opposing relation on two feed bars each of which performs a three-dimensional reciprocal movement. In the transfer feeder, the middle portions of the feed bars are formed of detachable middle bars, and some of the plurality of gripping claws are provided upwardly and downwardly movable relative to the middle bars. A transmission mechanism section for causing the gripping claws to upwardly and downwardly move is attached to each of the middle bars, and a drive link mechanism section for driving the transmission mechanism section in association with a feeding operation by the feed bars is provided over the lower die holder.

SUMMARY OF THE INVENTION

In the manufacturing of an automotive suspension arm, depending on the shape of the automotive suspension arm, a raw material preliminarily subjected to bending may be used as a forging raw material. In the manufacturing apparatus described in Japanese Unexamined Utility Model Application Publication No. Hei 06(1994)-530, a mechanism for performing bending is not provided so that a bent material produced with a bending device other than the manufacturing apparatus is used as a forging raw material. In that case, as a conventional bending device, a horizontal pressing machine has been used. Because the horizontal pressing machine has a mechanism for horizontally applying a force to the raw material, the lateral width (horizontal width) of the entire device is increased. As a result, a problem arises that a large installation area is required to install the horizontal pressing machine.

In addition, the transfer feeder described in Japanese Unexamined Utility Model Application Publication No. Hei 06(1994)-530 has a complicated device structure as described above, which results in a problem that the manufacturing apparatus including the transfer feeder is costly, and automated transportation in/out of members is not easy. Moreover, the manufacturing apparatus of Japanese Unexamined Utility Model Application Publication No. Hei 06(1994)-530 also has a problem that, when the horizontal pressing machine for performing a bending step is installed prior to an upsetting step using the upset die, a large installation area is required to install the manufacturing apparatus, as described above.

The present invention has been devised to solve such problems. It is therefore an object of the present invention to provide a bending die to be used in an apparatus and a method for manufacturing an automotive suspension arm to allow the manufacturing apparatus to have a simple and low-cost structure and a reduced installation area and perform automated manufacturing, and the apparatus and method for manufacturing the automotive suspension arm using the bending die.

To solve the problems described above, a bending die according to the present invention is a bending die used in an apparatus for manufacturing an automotive suspension arm to bend a rod-like raw material transported therein with a moving means and produce a bent material, including: a lower bending die including a mounting portion for mounting thereon the foregoing rod-like raw material; and an upper bending die including a pressing portion for vertically pressing the foregoing rod-like raw material mounted in a support groove of the foregoing lower bending die, wherein the foregoing mounting portion and the foregoing pressing portion include a lower die contact portion and an upper die contact portion each formed into a shape along a bent shape of the foregoing bent material to come in contact with the bent material, and the foregoing lower die contact portion includes, in a middle portion thereof, a groove portion, in non-contact relation with the bent material, formed to have a size which allows the foregoing moving means to grip the foregoing bent material.

In the foregoing arrangement, by providing the upper bending die with the pressing portion for vertically pressing the rod-like raw material, a mechanism is provided in which, at the time of bending, a force is vertically applied to the rod-like raw material. As a result, the lateral width (horizontal width) of the bending die can be reduced. In addition, by providing the lower die contact portion with the groove portion having the predetermined size, it is possible to insert a gripping portion of the moving means into the groove portion, and transport the bent material. The bending die facilitates automated manufacturing when incorporated into an apparatus for manufacturing the automotive suspension arm and used therein.

In the bending die according to the present invention, the foregoing upper die contact portion includes, in a middle portion thereof, a non-contact portion which does not come in contact with the foregoing bent material.

In the foregoing arrangement, by providing the upper die contact portion with the non-contact portion, a space portion is formed between the bent material and the upper die contact portion to absorb working strain in the bent material. Therefore, it is possible to reduce the difference between the shape of the bent material subjected to bending with the bending die for right wheels and the shape of the bent material subjected to bending with the bending die for left wheels.

An apparatus for manufacturing the automotive suspension arm according to the present invention is an apparatus for manufacturing the automotive suspension arm using the foregoing bending die, including: at least one forging device in which the foregoing bending die, a bust forging die for forging the bent material formed with the foregoing bending die to produce a bust forged material, and a finish forging die for forging the foregoing bust forged material to produce a finish forged material are juxtaposed; a trimming device for trimming a burr portion of the foregoing finish forged material; and the moving means for transporting the foregoing rod-like raw material onto the foregoing bending die, transporting the foregoing bent material to the foregoing bust forging die, transporting the foregoing bust forged material to the foregoing finish forging die, and transporting the foregoing finish forged material out of the forging device to the foregoing trimming device.

In the foregoing arrangement, by juxtaposing the foregoing bending die with the other forging dies in the forging device, the bending function is imparted to the manufacturing apparatus, while the structure of the manufacturing apparatus is prevented from being complicated, and the moving means such as a robot arm can be used for transporting in members and moving the members. In addition, by providing the manufacturing apparatus with the moving means, automated transportation in/out of the members is facilitated, and automated manufacturing of the automotive suspension arm is facilitated.

In the apparatus for manufacturing the automotive suspension arm according to the present invention, the foregoing moving means includes: a first moving means for transporting the foregoing rod-like raw material into the foregoing bending die, and transporting the foregoing bent material to the foregoing bust forging die; a second moving means for transporting the foregoing bust forged material to the foregoing finish forging die; and a third moving means for transporting the foregoing finish forged material out of the forging device to the foregoing trimming device.

In the foregoing arrangement, by providing the first moving means for transporting the bent material and transporting the bent material, the second moving means for transporting the bust forged material, and the third moving means for transporting the finish forged material out of the forging device to the trimming device, automated transportation in/out of the members is further facilitated, and automated manufacturing of the automotive suspension arm is further facilitated.

Alternatively, in the apparatus for manufacturing the automotive suspension arm according to the present invention, in the foregoing forging device, a rough forging die for forging the foregoing bust forged material to produce a rough forged material is further juxtaposed, and, in the foregoing finish forging die, the foregoing rough forged material is forged to produce the finish forged material, and the foregoing moving means transports the foregoing bust forged material to the foregoing rough forging die, and transports the foregoing rough forged material to the foregoing finish forging die.

In the foregoing arrangement, the juxtaposition of the rough forging die allows the degree of working in each of the dies to be set low. Accordingly, a complicated shape can be handled.

A method for manufacturing the automotive suspension arm according to the present invention is a method for manufacturing the automotive suspension arm using the foregoing manufacturing apparatus, including: a bending step of vertically pressing the foregoing rod-like raw material to bend the rod-like raw material using the foregoing bending die and produce the foregoing bent material; a bust forging step of forging the foregoing bent material using the foregoing bust forging die to produce the foregoing bust forged material; a finish forging step of forging the foregoing bust forged material using the foregoing finish forging die to produce the foregoing finish forged material; and a trimming step of trimming the burr portion of the foregoing finish forged material using the foregoing trimming device to manufacture the automotive suspension arm.

According to the foregoing manufacturing method, by performing the foregoing procedure using the foregoing manufacturing apparatus, automated manufacturing of the automotive suspension arm is facilitated.

Alternatively, the method for manufacturing the automotive suspension arm according to the present invention is a method for manufacturing the automotive suspension arm using the foregoing manufacturing apparatus, including: a bending step of vertically pressing the foregoing rod-like raw material to bend the rod-like raw material using the foregoing bending die and produce the foregoing bent material; a bust forging step of forging the foregoing bent material using the foregoing bust forging die to produce the foregoing bust forged material; a rough forging step of forging the foregoing bust forged material using the foregoing rough forging die to produce the foregoing rough forged material; a finish forging step of forging the foregoing rough forged material using the foregoing finish forging die to produce the foregoing finish forged material; and a trimming step of trimming the burr portion of the foregoing finish forged material using the foregoing trimming device to manufacture the automotive suspension arm.

According to the foregoing manufacturing method, by performing the foregoing procedure using the foregoing manufacturing apparatus, automated manufacturing of the automotive suspension arm is facilitated. In addition, by performing the rough forging step using the rough forging die, the degree of working in each of the dies can be set low, and accordingly a complicated shape can be handled.

When the bending die according to the present invention is incorporated into the apparatus for manufacturing the automotive suspension arm and used therein, the manufacturing apparatus has a simple and low-cost structure. This allows a reduction in the installation area of the apparatus, while allowing automated manufacturing. In addition, the manufactured automotive suspension arm has high dimensional accuracy.

The manufacturing apparatus according to the present invention has a simple and low-cost structure, and the installation area thereof can be reduced, while automated manufacturing is allowed. In addition, the manufacturing apparatus has an increased lifetime.

The manufacturing method according to the present invention allows automated manufacturing of the automotive suspension arm, and also increases the lifetime of the manufacturing apparatus.

DETAILED DESCRIPTION OF THE PREFERRED EMBODIMENTS

Figure 1A:
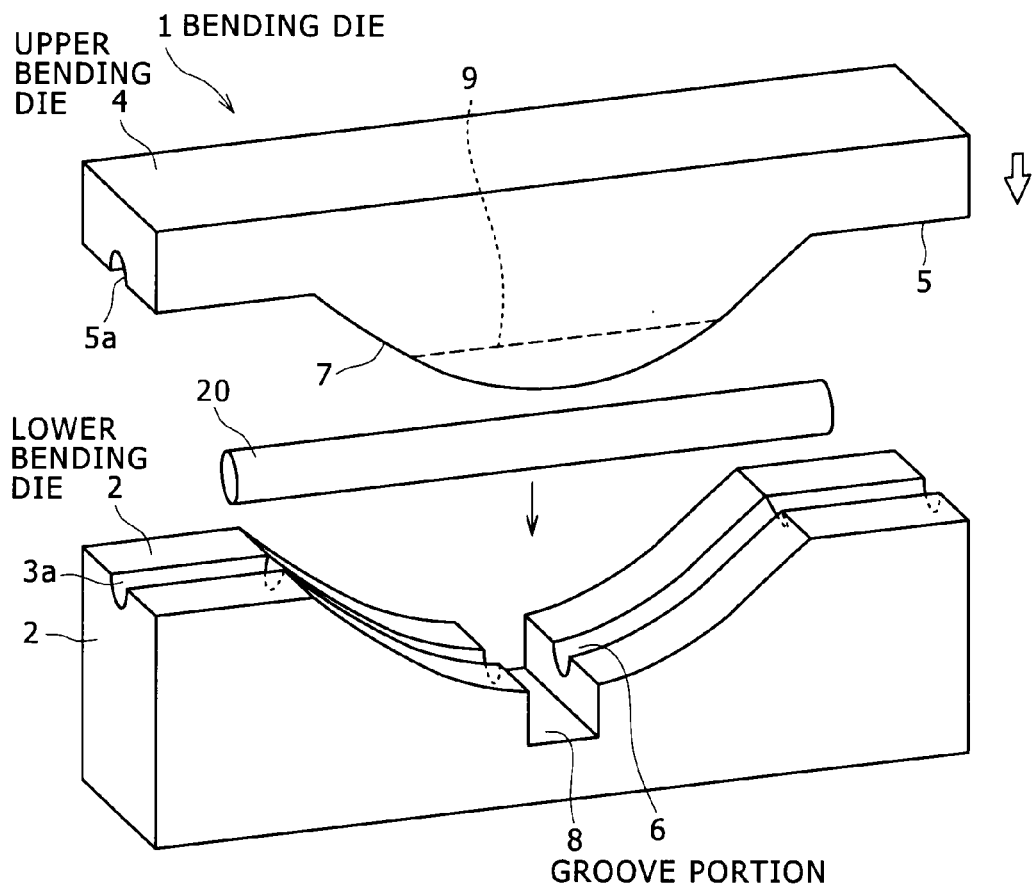
FIG. 1A is a perspective view showing a structure of a bending die according to the present invention.

Referring to the drawings, a bending die according to the present invention, and an apparatus and method for manufacturing an automotive suspension arm using the bending die will be described in detail.

<Bending Die>

The bending die according to the present invention is used in the apparatus for manufacturing the automotive suspension arm to bend a rod-like raw material and produce a bent material.

Note that the automotive suspension arm mostly has an axially asymmetrical and complicated shape, and is required to have robustness and fatigue strength as high as those of iron and steel materials, and also high impact resistance. Accordingly, as the rod-like raw material, a rod-like raw material made of a 6000-series aluminum alloy such as a 6061 alloy in accordance with JIS standards or an improved material thereof is used. Depending on the shape of the automotive suspension arm, not only a rod-like raw material having a circular, ellipsoidal, or like cross-sectional shape, but also an angular bar raw material having an angular cross-sectional shape such a quadrilateral or a hexagon may be used for the production of the bent material.

Figure 1B:
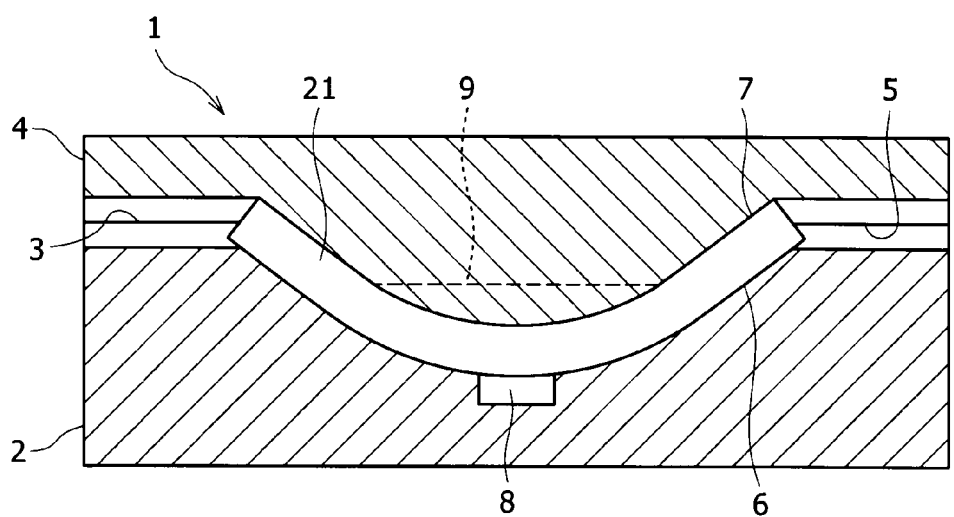
FIG. 1B is a cross-sectional view thereof during bending.
Figure 2A:
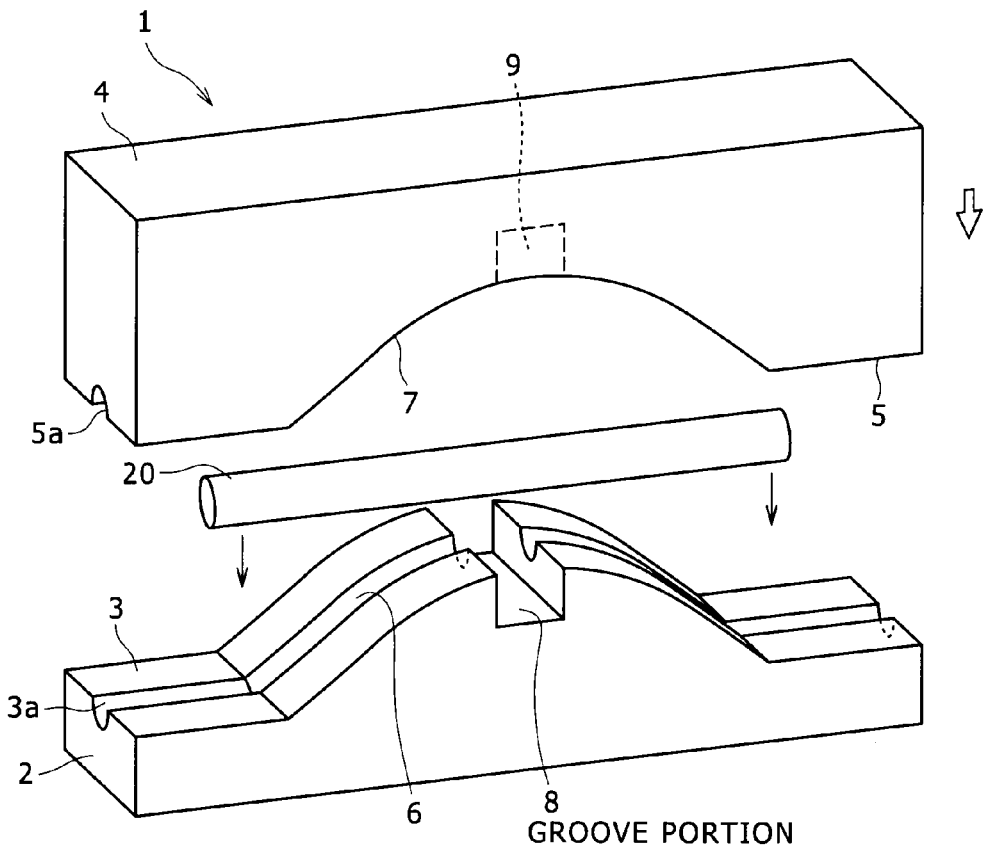
FIG. 2A is a perspective view showing a structure of the bending die according to the present invention.
Figure 2B:
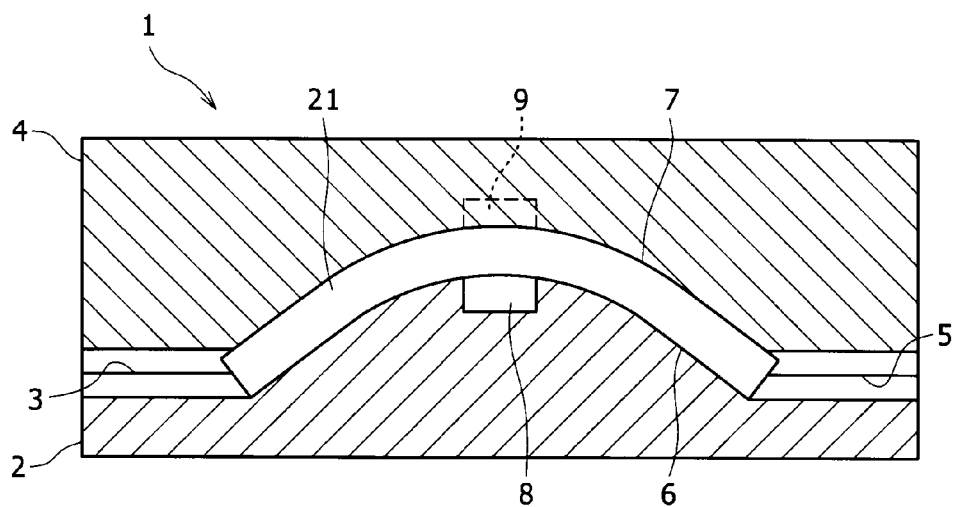
FIG. 2B is a cross-sectional view thereof during the bending.

As shown in FIGS. 1A, 1B, 2A, and 2B, a bending die 1 includes a lower bending die 2 and an upper bending die 4. In FIGS. 1A and 1B, a bending die for right wheels used in an apparatus for manufacturing a suspension arm for right wheels is shown, while a bending die for left wheels used in an apparatus for manufacturing a suspension arm for left wheels is shown in FIGS. 2A and 2B.

(Lower Bending Die)

The lower bending die 2 includes a mounting portion 3 for mounting thereon a rod-like raw material 20. The mounting portion 3 includes a support groove 3a for supporting the rod-like raw material 20 mounted thereon. Here, the mounting portion 3 is a surface which faces a pressing portion 5 of the upper bending die 4 at the time of bending. The mounting portion 3 is in inter-engaged relation with the pressing portion 5, and formed to be larger in size than the rod-like raw material 20. The support groove 3a is formed along the axial direction of the rod-like raw material 20, and preferably has a circular groove shape or an angular groove shape which allows easy supporting of the rod-like raw material 20.

The mounting portion 3 includes a lower die contact portion 6 formed into a shape along the bent shape of a produced bent material 21 to come in contact with the bent material 21. Here, the bent shape of the bent material 21 is determined appropriately in accordance with the shape of the automotive suspension arm as a final product. For example, the bent material 21 has a bent shape which is curved along the axial direction.

Specifically, as shown in FIGS. 1A and 1B, the lower die contact portion 6 in the bending die 1 for right wheels is formed into a shape (depressed shape) which is downwardly curved along the bent shape of the bent material 21. As shown in FIGS. 2A and 2B, the lower die contact portion 6 in the bending die 1 for left wheels is formed into a shape (protruding shape) which is upwardly curved along the bent shape of the bent material 21.

The lower die contact portion 6 includes, in the middle portion thereof, a groove portion 8 formed to be orthogonal to the axial direction of the bent material 21. The groove portion 8 serves as a space portion into which gripping portions 16c (see FIG. 8) of a moving means, e.g., a first moving means 16 are inserted when the bent material 21 is moved from the bending die 1. Accordingly, the groove portion 8 is formed to have a size which keeps it from contact with the bent material 21 even when the bent material 21 is pressed and which allows the gripping portions 16c of the first moving means 16 to grip the bent material 21. As shown in FIGS. 1B and 2B, the groove portion 8 is formed to have a generally quadrilateral shape when viewed in cross section. However, the shape of the groove portion 8 is not limited thereto, and may also be a semicircle, a triangle, or the like as long as the gripping portions 16c can enter the groove portion 8 and grip the bent material 21.

(Upper Bending Die)

The upper bending die 4 includes the pressing portion 5 for vertically pressing the rod-like raw material 20 mounted on the lower bending die 2, and the pressing portion 5 includes a support groove 5a. Here, the pressing portion 5 is a surface which faces the mounting portion 3 of the lower bending die 2 at the time of bending, which is in inter-engaged relation with the mounting portion 3. The support groove 5a is formed along the axial direction of the rod-like raw material 20 (bent material 21), and has a round groove shape for pressing the rod-like raw material 20.

The pressing portion 5 is formed into a shape along the bent shape of the bent material 21 produced by bending, and includes an upper die contact portion 7 which comes in contact with the bent material 21. Here, the bent shape of the bent material 21 is determined appropriately in accordance with the shape of the automotive suspension arm as the final product. For example, the bent material 21 has a bent shape which is curved along the axial direction.

Specifically, as shown in FIGS. 1A and 1B, the upper die contact portion 7 in the bending die 1 for right wheels is formed into a shape (protruding shape) which is downwardly curved along the bent shape of the bent material 21. As shown in FIGS. 2A and 2B, the upper die contact portion 7 in the bending die 1 for left wheels is formed into a shape (depressed shape) which is upwardly curved along the bent shape of the bent material 21.

Preferably, the upper bending die 4 includes, in the middle portion of the upper die contact portion 7, a non-contact portion 9 which does not come in contact with the bent material 21. The non-contact portion 9 is formed by upwardly denting the top portion or bottom portion of the upper die contact portion 7 so as to form a space portion between the upper die contact portion 7 and the bent material 21. Specifically, as shown in FIGS. 1A and 1B, the non-contact portion 9 in the bending die 1 for right wheels is a surface which is formed by upwardly denting the top portion of the upper die contact portion 7. As shown in FIGS. 2A and 2B, the non-contact portion 9 in the bending die 1 for left wheels is a groove portion orthogonal to the axial direction of the rod-like raw material 20 which is formed by upwardly denting the bottom portion of the upper die contact portion 7.

By forming the non-contact portion 9 in the upper bending die 4, the space portion is formed between the bent material 21 and the upper die contact portion 7 to absorb working strain in the bent material 21. Therefore, it is possible to reduce the difference between the shape of the bent material 21 subjected to bending with the bending die 1 for right wheels and the shape of the bent material 21 subjected to bending with the bending die 1 for left wheels. Note that the shape of the non-contact portion 9 is not particularly limited.

<Manufacturing Apparatus>

Next, an apparatus for manufacturing the automotive suspension arm will be described. The manufacturing apparatus is a manufacturing apparatus using the bending die described above.

Figure 3:
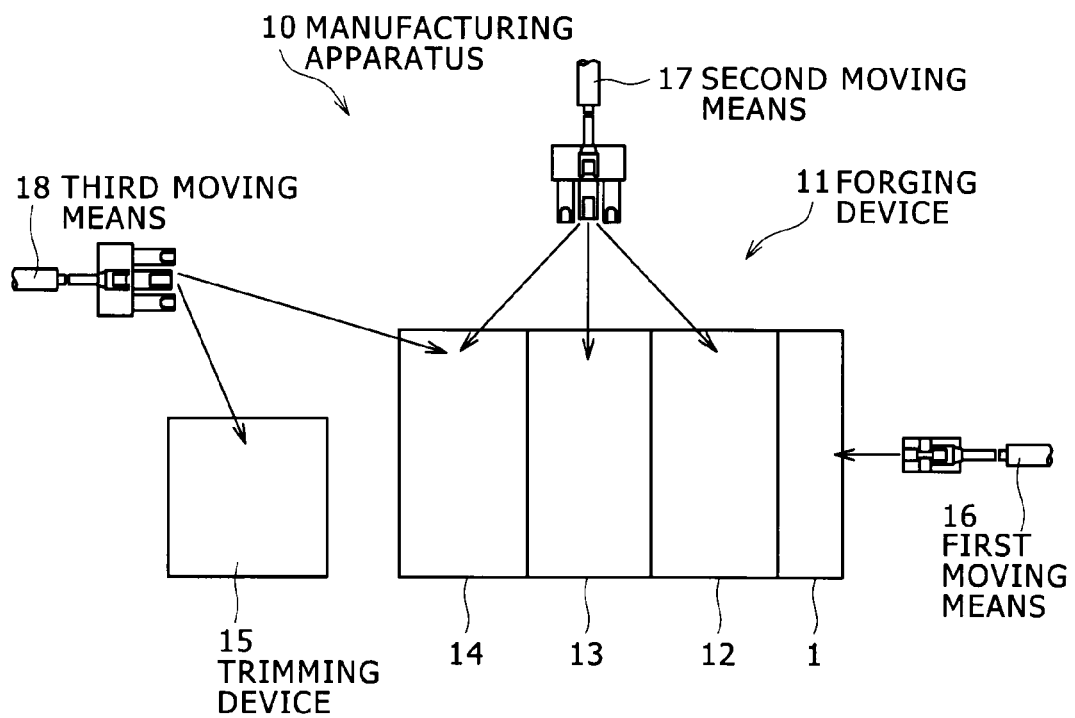
FIG. 3 is a view schematically showing a structure of a manufacturing apparatus according to the present invention.

As shown in FIG. 3, the manufacturing apparatus 10 includes a forging device 11, a trimming device 15, and moving means (a first moving means 16, a second moving means 17, and a third moving means 18).

(Forging Device)

In the forging device 11, the bending die 1, a bust forging die 12, and a finish forging die 14 are juxtaposed in this order.

Figures 4A, 4B, 4C:
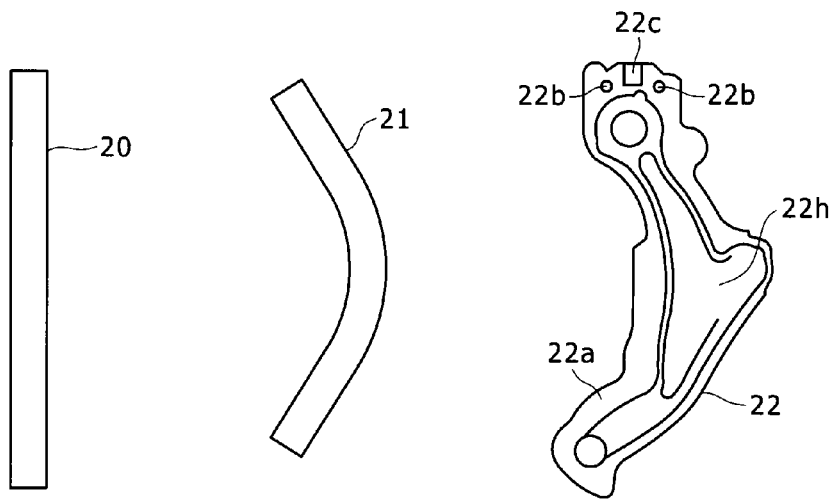
FIGS. 4A to 4F are views schematically showing the shapes of members obtained at individual stages in the manufacturing apparatus according to the present invention.

As described above, the bending die 1 is for bending the rod-like raw material 20 shown in FIG. 4A to produce the bent material 21 shown in FIG. 4B. The structure of the bending die 1 is as described above, and therefore a description thereof is omitted.

The bust forging die 12 is for forging the bent material 21 produced with the bending die 1 to produce a bust forged material 22 having a flat plate shape as shown in FIG. 4C.

Figure 5A:
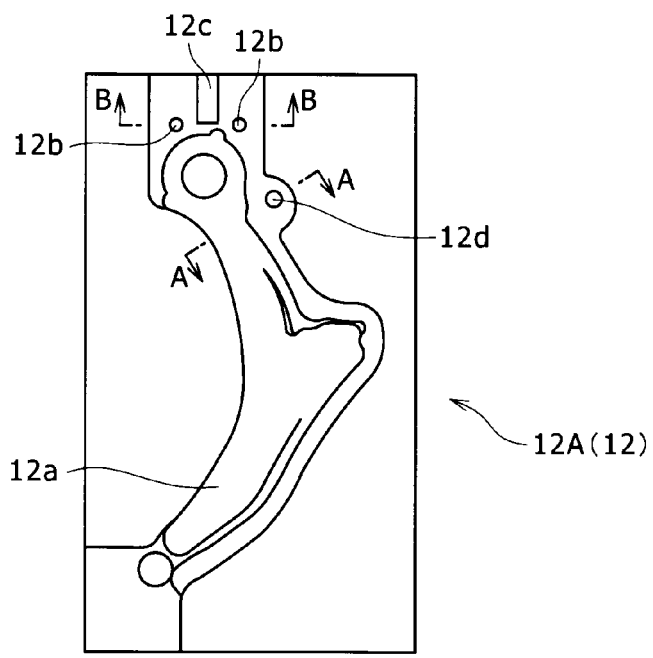
FIG. 5A is a plan view of a bust forging die.
Figure 5B:
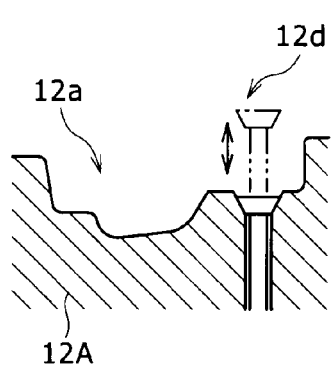
FIG. 5B is a cross-sectional view along the line A-A of FIG. 5A.
Figure 5C:
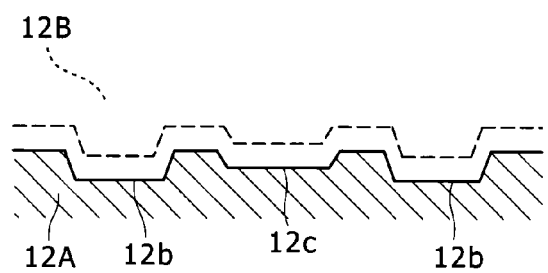
FIG. 5C is a cross-sectional view along the line B-B of FIG. 5A.

As shown in FIGS. 5A and 5C, the bust forging die 12 includes a lower busting die 12A formed with a depressed portion 12*a* for producing the bust forged material 22 and an upper busting die 12B formed with a protruding portion corresponding to the depressed portion 12*a*. On the lower busting die 12A, the bent material 21 is mounted and, by pressing the upper busting die 12B, the bust forged material 22 is produced.

In the depressed portion 12*a* of the lower busting die 12A, a knock-out pin 12*d* is buried. As shown in FIG. 5B, the knock-out pin 12*d* protrudes into the depressed portion 12*a* after the end of forging to press the back surface of the produced bust forged material 22, and cause the bust forged material 22 to float from the depressed portion 12*a*. As a result, when the bust forged material 22 is moved to the finish forging die 14, the bust forged material 22 is easily gripped with the moving means (second moving means 17).

As shown in FIGS. 5A and 5C, in the depressed portion 12*a* of the lower busting die 12A, round pin portions 12*b* each formed into a circular depressed shape and a flat surface portion 12*c* formed into a rectangular depressed shape are formed at predetermined positions. The round pin portions 12*b* and the flat surface portion 12*c* form depressed portions 22*b* and 22*c* corresponding to the round pin portions 12*b* and the flat surface portion 12*c* in the end portion of the bust forged material 22 through forging whereby the upper busting die 12B is pressed against the lower busting die 12A. Here, the end portion of the bust forged material 22 means a burr portion 22*a* formed in the outer peripheral portion of a main body portion 22*h* of the bust forged material 22 which serves as an automotive suspension arm 25 (see FIG. 4F) at the end of manufacturing. Accordingly, the round pin portions 12*b* and the flat surface portion 12*c* are formed at the end portion of the depressed portion 12*a* where the burr portion 22*a* is formed.

The depressed portions 22*b* and 22*c* of the bust forged material 22 are gripped with the moving means (second moving means 17) when the bust forged material 22 is moved to the finish forging die 14. Accordingly, the shapes of the round pin portions 12*b* and the flat surface portion 12*c* are determined such that the depressed portions 22*b* and 22*c* formed correspondingly to the round pin portions 12*b* and the flat surface portion 12*c* are aligned with an upper gripping portion 17*d* and lower gripping portions 17*f* (see FIG. 9) of the second moving means 17.

Note that the round pin portions 12*b* and the flat surface portion 12*c* (the depressed portions 22*b* and 22*c*) are used also for position adjustment when the bust forged material 22 is mounted on the finish forging die 14.

Figures 4D, 4E, 4F:
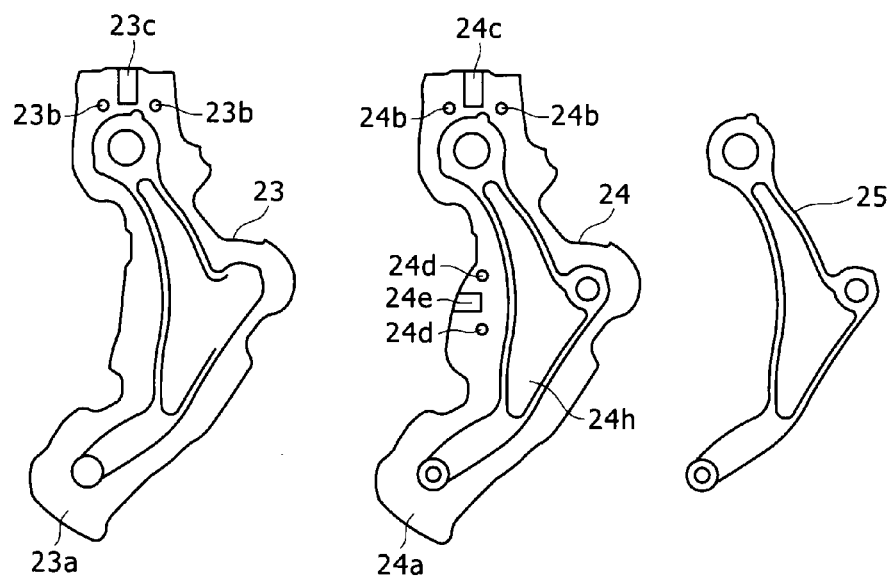

The finish forging die 14 is for forging the bust forged material 22 produced with the bust forging die 12 to produce a finish forged material 24 having a flat plate shape as shown in FIG. 4E.

Figure 7:
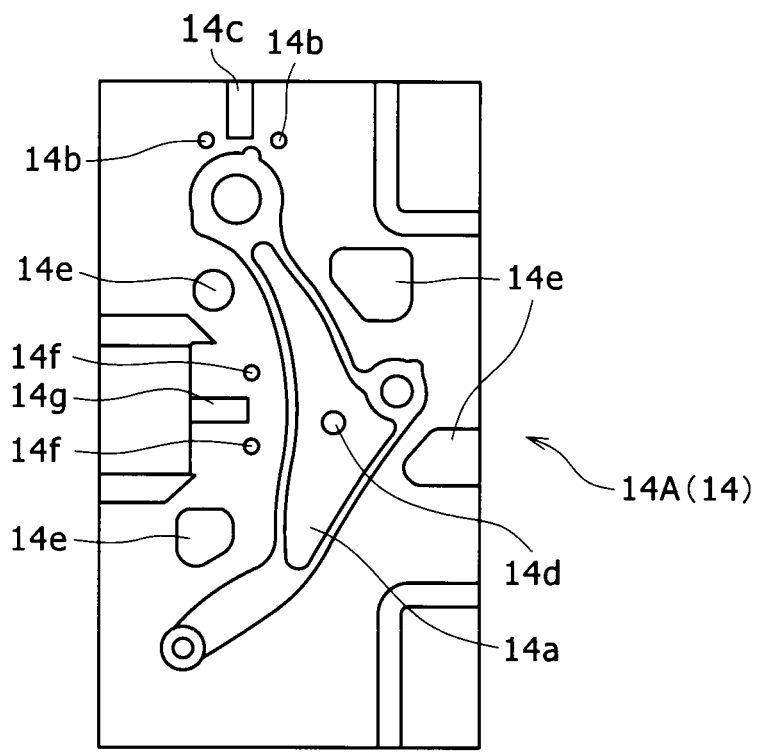
FIG. 7 is a plan view of a finish forging die.

As shown in FIG. 7, the finish forging die 14 includes a lower finishing die 14A formed with a depressed portion 14*a* for producing the finish forged material 24 and an upper finishing die (not shown) formed with a projecting portion corresponding to the depressed portion 14*a*. The bust forged material 22 is mounted on the lower finishing die 14A and, by pressing the upper finishing die, the finish forged material 24 is produced.

In the depressed portion 14*a* of the lower finishing die 14A, a knock-out pin 14*d* is buried. The knock-out pin 14*d* protrudes into the depressed portion 14*a* after the end of forging to press the back surface of the produced finish forged material 24 (see FIG. 4E), and cause the finish forged material 24 from the depressed portion 14*a*. As a result, when the finish forged material 24 is moved to the trimming device 15 (see FIG. 3), the finish forged material 24 is easily gripped with the moving means (third moving means 18, see FIG. 9).

In the lower finishing die 14A, round pin portions 14*b* each formed into a circular depressed shape and a flat surface portion 14*c* formed into a rectangular depressed shape are formed at predetermined positions. The round pin portions 14*b* and the flat surface portion 14*c* are formed at the same positions and into the same shapes as those of the round pin portions 12*b* and the flat surface portion 12*c* of the upper busting die 12B (see FIG. 5A). The round pin portions 14*b* and the flat surface portion 14*c* are aligned with the depressed portions 22*b* and 22*c* of the bust forged material 22 (see FIG. 4C) when the bust forged material 22 is mounted on the lower finishing die 14A. In this manner, the mounting position of the bust forged material 22 is adjusted.

Note that, by forming the round pin portions 14*b* and the flat surface portion 14*c*, depressed portions 24*b* and 24*c* are formed in the finish forged material 24 (see FIG. 4E). The depressed portions 24*b* and 24*c* are used to adjust the mounting position of the finish forged material 24 when the finish forged material 24 is mounted on a trimming die (not shown) of the trimming device 15 (see FIG. 3).

In the lower finishing die 14A, a plurality of projecting portions 14*e* are formed to come in contact with the outer peripheral portion of the burr portion 22*a* (see FIG. 4C) of the bust forged material 22 mounted thereon and restrain the bust forged material 22. By forming the projecting portions 14*e*, the mounting position of the mounted bust forged material 22 is further adjusted.

In the lower finishing die 14A, round pin portions 14*f* each formed into a circular depressed shape and a flat surface portion 14*g* formed into a rectangular depressed shape are formed at predetermined positions. The round pin portions 14*f* and the flat surface portion 14*g* are formed into the same shapes as those of the round pin portions 14*b* and the flat surface portion 14*c* each described above but at positions different from those of the round pin portions 14*b* and the flat surface portion 14*c*. By forming the round pin portions 14*f* and the flat surface portion 14*g*, depressed portions 24*d* and 24*e* are formed in the end portion of the finish forged material 24 (see FIG. 4E). The depressed portions 24*d* and 24*e* are gripped with the moving means (third moving means 18) when the finish forged material 24 is transported out into the trimming device 15 (see FIG. 3), and aligned with an upper gripping portion 18*d* and lower gripping portions 18*f* (see FIG. 9) of the third moving means 18. As a result, the finish forged material 24 is easily gripped with the third moving means 18.

In the forging device 11, as a component other than those described above, e.g., as a press device for downwardly moving the upper bending die 4, the upper busting die 12B, and the upper finishing die to press the lower bending die 2, the lower busting die 12A and the lower finishing die 14A, a conventionally known press device is used. It may also be possible to upwardly and downwardly move all the upper dies described above using one press device or upwardly and downwardly move each of the upper dies using three press devices. Note that, in FIG. 3, an example is shown in which the bending die 1, the bust forging die 12, and the finish forging die 14 are juxtaposed in the one forging device 11, but it may also be possible to juxtapose a forging device provided with the bending die 1 and a forging device provided with the bust forging die 12 and the finish forging die 14, i.e., the two forging devices. Otherwise, it may also be possible to juxtapose a forging device provided with the bending die 1, a forging device provided with the bust forging die 12, and a forging device provided with the finish forging die 14, i.e., the three forging devices.

(Trimming Device)

As shown in FIG. 3, the structure of the trimming device 15 is not particularly limited as long as the trimming device 15 can trim a burr portion 24*a* (see FIG. 4E) of the finish forged material 24, and produce the automotive suspension arm 25 (see FIG. 4F), and a conventionally known trimming device (not shown) including the trimming die is used. It may also be possible to juxtapose the trimming die with the plurality of dies of the forging device described above, and use the forging device as the trimming device.

(Moving Means)

The moving means is for transporting the rod-like raw material 20 onto the bending die 1, transporting the bent material 21 to the bust forging die 12, transporting the bust forged material 22 to the finish forging die 14, and transporting the finish forged material 24 out to the trimming device 15. By thus using the moving means for transportation in/out of the members, automated manufacturing of the automotive suspension arm is facilitated.

The structure of the moving means is not particularly limited as long as the moving means has the function of allowing the members to be gripped and transported in/out. However, as the gripping portion of the moving means, two gripping portions are preferably used depending on the shapes of the members. Specifically, it is preferable to use two types of gripping portions which are the gripping portion that allows easy gripping of a rod-like member such as the rod-like raw material 20 or the bent material 21 and the gripping portion that allows easy gripping of a member having a flat plate shape such as each of the forged materials.

The moving means may perform the transportation in/out of various members using one moving means but, preferably, the transportation in/out of the members is performed using three moving means which are the first moving means 16 for transporting in the rod-like raw material 20 and transporting the bent material 21, the second moving means 17 for transporting the bust forged material 22, and the third moving means 18 for transporting out the finish forged material 24. By using the three moving means, a time required for the transportation in/out of the members is reduced, and automated manufacturing is further facilitated. The structures of the first moving means 16, the second moving means 17, and the third moving means 18 are not particularly limited, but it is preferable to have the following structure.

As shown in FIG. 3, the structure of the first moving means 16 is not particularly limited as long as the first moving means 16 can transport the rod-like raw material 20 (see FIG. 4A) into the bending die 1, and move the bent material 21 (see FIG. 4B) produced with the bending die 1 to the bust forging die 12. A robot arm is preferred and, for example, the first moving means 16 shown below is used.

Figure 8A:
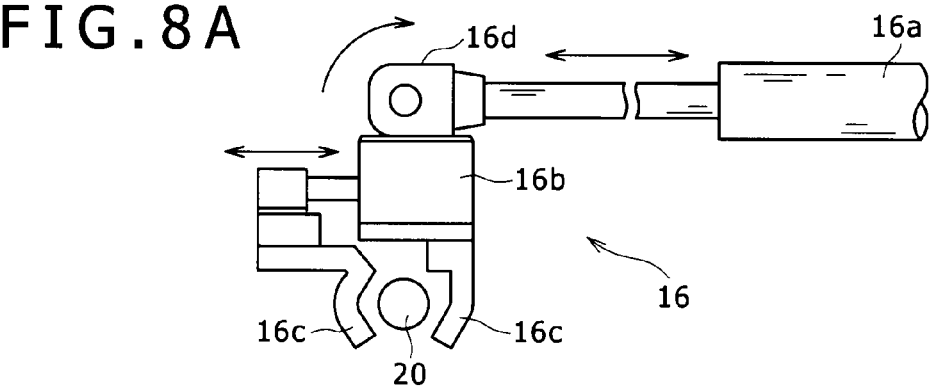
FIGS. 8A and 8B are front views of a first moving means (robot arm)
Figure 8B:
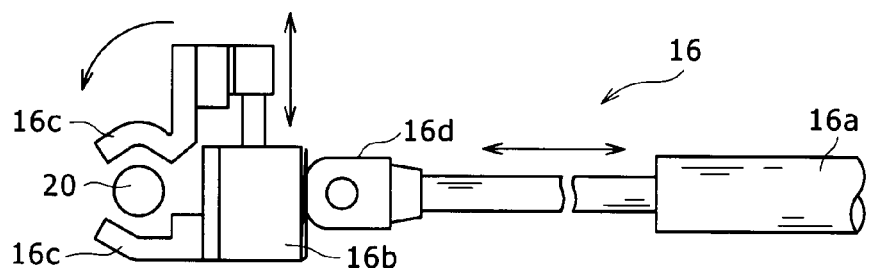

As shown in FIGS. 8A and 8B, the first moving means 16 includes a main body portion 16*b* for opening and closing the pair of gripping portions 16*c* with a cylinder or the like to grip the rod-like raw material 20, an arm portion 16*a* for horizontally moving the main body portion 16*b* with a cylinder or the like, and a rotational driving portion 16*d* for rotating the gripping portions 16*c* in the front-to-rear direction of the arm portion 16*a*.

As shown in FIG. 3, the structure of the second moving means 17 is not particularly limited as long as the second moving means 17 can move the bust forged material 22 (see FIG. 4C) produced with the bust forging die 12 to the finish forging die 14. A robot arm is preferred and, e.g., the second moving means 17 shown below is used.

Figure 9A:
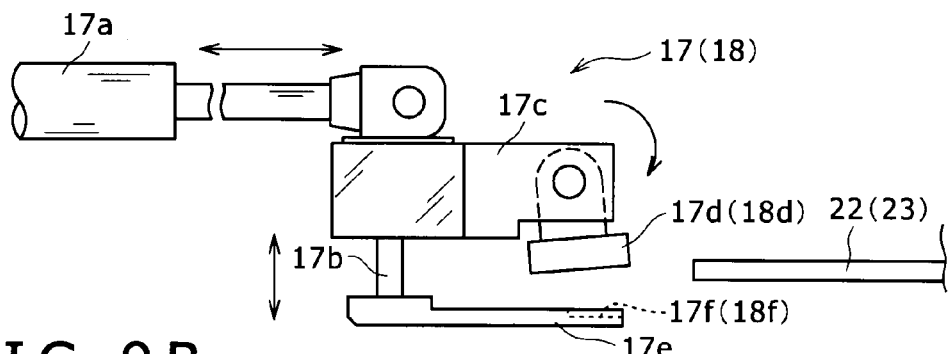
FIGS. 9A and 9B are front views of a second or third moving means (robot arm)
Figure 9B:
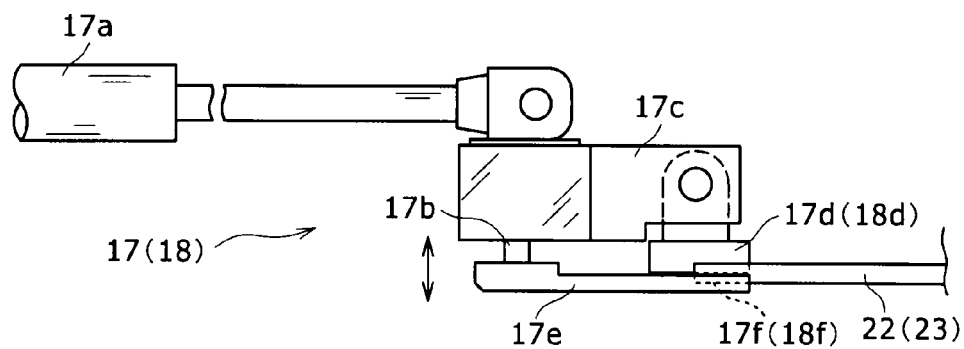

As shown in FIGS. 9A and 9B, the second moving means 17 includes a main body portion 17*b* for upwardly and downwardly moving one upper claw portion 17*c* relative to two lower claw portions 17*e* with a cylinder or the like to grip the bust forged material 22, and an arm portion 17*a* for horizontally moving the main body portion 17*b* with a cylinder or the like.

Figure 5D:
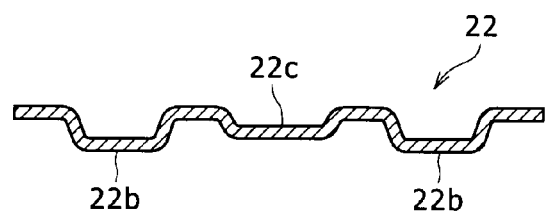
FIG. 5D is a cross-sectional view along the line B-B of a bust forged material produced with the bust forging die.

Preferably, the second moving means 17 includes the upper gripping portion 17*d* which is provided at the tip portion of the upper claw portion 17*c* to come in contact with the upper surface of the depressed portion 22*c* (see FIGS. 4C and 5D) of the bust forged material 22 when the bust forged material 22 is gripped, and the groove-like lower gripping portions 17*f* which are provided in the respective tip portions of the lower claw portions 17*e* to come in contact with the lower surfaces of the depressed portions 22*b* (see FIGS. 4C and 5D) of the bust forged material 22 when the bust forged material 22 is gripped. In addition, the upper gripping portion 17*d* preferably rotates in the front-to-rear direction of the upper claw portion 17*c* to come in contact with the depressed portion 22*c* of the bust forged material 22. By providing the second moving means 17 with these upper gripping portion 17*d* and lower gripping portions 17*f*, when the bust forged material 22 is gripped, the bust forged material 22 is prevented from swaying in the front-to-rear direction, and can stably be gripped.

More preferably, the second moving means 17 can adjust an amount of stroke of the cylinder of the main body portion 17*b* to allow the upper claw portion 17*c* and the lower claw portions 17*e* to cross each other. As a result, it becomes possible to determine the case where the bust forged material 22 cannot be gripped and the upper claw portion 17*c* and the lower claw portions 17*e* cross each other from the amount of stroke of the cylinder, and automatically stop the manufacturing apparatus via an auto-switch.

As shown in FIG. 3, the structure of the third moving means 18 is not particularly limited as long as the third moving means 18 can transport out the finish forged material 24 (see FIG. 4E) produced with the finish forging die 14 into the trimming device 15. A robot arm is preferred and, e.g., the third moving means 18 having the same structure as that of the second moving means 17 described above is used.

As shown in FIG. 3, in the forging device 11 in the manufacturing apparatus 10 according to the present invention, a rough forging die 13 is further juxtaposed between the bust forging die 12 and the finish forging die 14. In the manufacturing apparatus 10, the rough forging die 13 is for forging the bust forged material 22 (see FIG. 4C) to produce a rough forged material 23 (see FIG. 4D). In the finish forging die 14, the rough forged material 23 is forged to produce the finish forged material 24 (see FIG. 4E), and the moving means (second moving means 17) moves the bust forged material 22 to the rough forging die 13 and moves the rough forged material 23 to the finish forging die 14.

Figure 6:
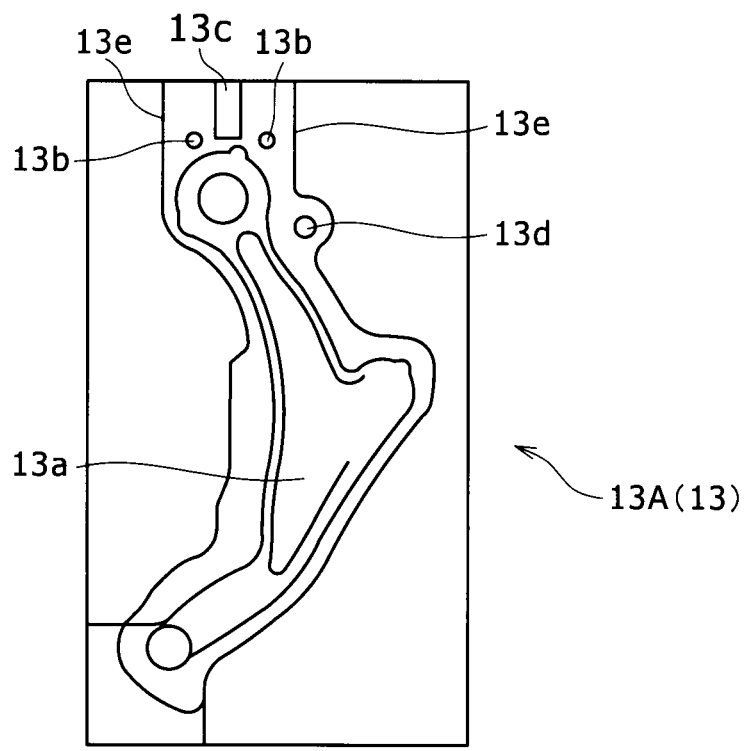
FIG. 6 is a plan view of a rough forging die.

As shown in FIG. 6, the rough forging die 13 includes a lower rough forging die 13A formed with a depressed portion 13a for producing the rough forged material 23, and an upper rough forging die (not shown) formed with a protruding portion corresponding to the depressed portion 13a. On the lower rough forging die 13A, the bust forged material 22 is mounted and, by pressing the upper rough forging die, the rough forged material 23 is produced.

In the depressed portion 13a of the lower rough forging die 13A, a knock-out pin 13d is buried. The knock-out pin 13d protrudes into the depressed portion 13a after the end of forging to press the back surface of the produced rough forged material 23 (see FIG. 4D), and cause the rough forged material 23 to float from the depressed portion 13a. As a result, when the rough forged material 23 is transported to the finish forging die 14 (see FIG. 3), the rough forged material 23 is easily gripped with the moving means (second moving means 17).

In the depressed portion 13a of the lower rough forging die 13A, round pin portions 13b each formed into a circular depressed shape and a flat surface portion 13c formed into a rectangular depressed shape are formed at predetermined positions. The round pin portions 13b and the flat surface portion 13c are formed at the same positions and into the same shapes as those of the round pin portions 12b and the flat surface portion 12c of the lower busting die 12A (see FIG. 5A). The round pin portions 13b and the flat surface portion 13c are aligned with the depressed portions 22b and 22c of the bust forged material 22 when the bust forged material 22 (see FIG. 4C) is mounted on the lower rough forging die 13A. In this manner, the mounting position of the bust forged material 22 is adjusted.

In the lower rough forging die 13A, wall portions 13e are formed by the depressed portion 13a. The wall portions 13e come in contact with the outer peripheral portion of the bur portion 22a of the mounted bust forged material 22 to restrain the bust forged material 22. As a result, the mounting position of the mounted bust forged material 22 is further adjusted.

By forming the round pin portions 13b and the flat surface portion 13c, depressed portions 23b and 23c are formed in the rough forged material 23 (see FIG. 4D). The depressed portions 23b and 23c are aligned with the round pin portions 14b and the flat surface portion 14c of the finish forging die 14 when the rough forged material 23 is mounted on the finish forging die 14. In this manner, the mounting position of the rough forged material 23 is adjusted.

Further, when the rough forged material 23 is moved to the finish forging die 14 (see FIG. 3), the depressed portions 23b and 23c of the rough forged material 23 (see FIG. 4D) are gripped with the moving means (second moving means 17, see FIG. 9), and aligned with the upper gripping portion 17d and the lower gripping portions 17f of the second moving means 17. As a result, the rough forged material 23 is easily gripped with the moving means (second moving means 17).

Thus far, the apparatus for manufacturing the automotive suspension arm has been described. The manufacturing apparatus of the present invention includes, besides the components described above, a conventionally known control device for controlling pressing in the forging device, movement with each of the moving means therein, and the like.

<Manufacturing Method>

Next, a method for manufacturing the automotive suspension arm will be described. The manufacturing method according to the present invention is a method for manufacturing the automotive suspension arm using the manufacturing apparatus described above.

Figure 10:
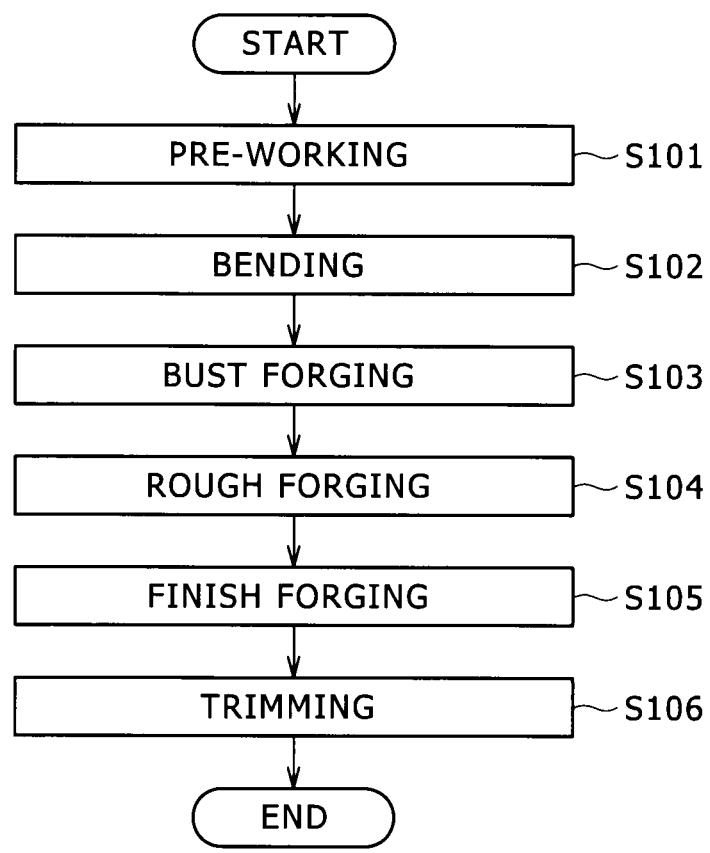
FIG. 10 is a flow chart of a manufacturing method according to the present invention.

As shown in FIG. 10, the manufacturing method according to the present invention includes a bending step S102, a bust forging step S103, a finish forging step S105, and a trimming step S106. Hereinbelow, each of the steps will be described. Note that the structure of the bending die and the structure of the manufacturing apparatus will be described as necessary with reference to the drawings.

(Bending Step)

The bending step S102 is the step of bending the rod-like raw material 20 using the bending die 1 to produce the bent material 21.

First, the rod-like raw material 20 produced by extrusion or casting and cut to have a predetermined length is mounted on the lower bending die 2 using the moving means (first moving means 16). The mounted rod-like raw material 20 is pressed in a vertical direction using the upper bending die 4 to produce the bent material 21. Note that pressing conditions (bending conditions) are set appropriately in consideration of the material, bent shape, and the like of the rod-like raw material 20. Note that, since the direction in which the upper bending die 4 is pressed is the vertical direction, the lateral width (horizontal width) of the bending die 1 can be reduced.

Next, by inserting the moving means (first moving means 16) into the groove portion 8 of the lower bending die 2, the produced bent material 21 is gripped with the moving means (first moving means 16). Then, the bent material 21 is driven by the rotational driving portion 16d of the first moving means 16 to be rotated around the axis thereof by 90 degrees and, in that state, the bent material 21 is mounted on the bust forging die 12 (lower busting die 12A).

(Bust Forging Step)

The bust forging step S103 is the step of forging the bent material 21 using the bust forging die 12 to produce the bust forged material 22.

First, the bent material 21 mounted on the lower busting die 12A is pressed with the upper busting die to produce the bust forged material 22. Note that pressing conditions (forging conditions) are set appropriately in consideration of the material, bust forged shape, and the like of the rod-like raw material 20.

Next, after the pressing with the upper busting die is removed (after the upper busting die is upwardly moved), the bust forged material 22 on the lower busting die 12A is caused to float from the lower busting die 12A by the protrusion of the knock-out pin 12d into the depressed portion 12a. The floating bust forged material 22 (with the depressed portions 22b and 22c) is gripped with the moving means (second moving means 17). Using the moving means (second moving means 17), the bust forged material 22 is mounted on the finish forging die 14 (lower finishing die 14A).

(Finish Forging Step)

The finish forging step S105 is the step of forging the bust forged material 22 using the finish forging die 14 to produce the finish forged material 24.

First, the bust forged material 22 mounted on the lower finishing die 14A is pressed with the upper finishing die to produce the finish forged material 24. Note that pressing conditions (forging conditions) are set appropriately in consideration of the material, finish forged shape, and the like of the rod-like raw material 20.

Next, after the pressing with the upper finishing die is lifted up (after the upper finishing die is upwardly moved), the finish forged material 24 on the lower finishing die 14A is pushed up from the lower finishing die 14A by the protrusion of the knock-out pin 14d into the depressed portion 14a. The floating finish forged material 24 (with the depressed portions 24d and 24e) is gripped with the moving means (third moving means 18). Using the moving means (third moving means 18), the finish forged material 24 is transported out into the trimming device 15.

(Trimming Step)

The trimming step S106 is the step of trimming the burr portion 24a of the finish forged material 24 using the trimming device 15 to manufacture the automotive suspension arm 25.

For the trimming of the finish forged material 24 that has been transported out, the trimming device 15 including, e.g., a pair of an upper trimming die and a lower trimming die is used. Then, by pressing the finish forged material 24 mounted on the lower trimming die with the upper trimming die, the burr portion 24a is trimmed so that the automotive suspension arm 25 is produced. Note that pressing conditions (trimming conditions) are set appropriately in consideration of the material of the rod-like raw material 20, the shape of the suspension arm, and the like.

Note that, after the end of trimming, it may also be possible to perform additional steps such as the drilling of boss holes, the attachment of bushes into the boss holes, and the like.

In the description of the manufacturing method given above, after the end of manufacturing of the automotive suspension arm 25, the manufacturing of the next automotive suspension arm 25 is started. However, the manufacturing of the next automotive suspension arm 25 may also be started or performed in parallel during the manufacturing of the previous automotive suspension arm 25. For example, the bust forging step S103 and the finish forging step S105 or the trimming step S106 for the previous automotive suspension arm 25 and the bending step S102 for the next automotive suspension arm 25 may be simultaneously performed. Alternatively, the finish forging step S105 or the trimming step S106 for the preceding automotive suspension arm 25, the bust forging step S103 for the succeeding automotive suspension arm 25, and the bending step S102 for the succeeding automotive suspension arm 25 may also be simultaneously performed.

The manufacturing method according to the present invention may also include the bending step S102, the bust forging step S103, a rough forging step S104, the finish forging step S105, and the trimming step S106. The bending step S102 and the trimming step S106 are the same as described above, and therefore a description thereof is omitted.

(Bust Forging Step)

The bust forging step is the same as described above except that the bust forged die 22 is mounted on the rough forging die 13 (lower rough forging die 13A) using the moving means (second moving means 17).

(Rough Forging Step)

The rough forging step S104 is the step of forging the bust forged material 22 using the rough forging die 13 to produce the rough forged material 23.

First, the bust forged material 22 mounted on the lower rough forging die 13A is pressed with the upper rough forging die to produce the rough forged material 23. Note that pressing conditions (forging conditions) are set appropriately in consideration of the material, rough forged shape, and the like of the rod-like raw material 20.

Next, after the pressing with the upper rough forging die is lifted up (after the upper rough forging die is upwardly moved), the rough forged material 23 on the lower rough forging die 13A is pushed up from the lower rough forging die 13A by the protrusion of the knock-out pin 13d into the depressed portion 13a. The floating rough forged material 23 (with the depressed portions 23b and 23c) is gripped with the moving means (second moving means 17). Using the moving means (second moving means 17), the rough forged material 23 is mounted on the finish forging die 14 (lower finishing die 14A).

(Finish Forging Step)

The finish forging step is the same as described above except that the rough forged material 23 is forged using the finish forging die 14 to produce the finish forged material 24.

In the description of the manufacturing method given above, after the end of manufacturing of the automotive suspension arm 25, the manufacturing of the next automotive suspension arm 25 is started. However, as described above, the manufacturing of the next automotive suspension arm 25 may also be started or performed in parallel during the manufacturing of the previous automotive suspension arm 25.

The manufacturing method according to the present invention may also include, previous to the bending step S102, a pre-working step S101.

The pre-working step S101 is performed so as to reduce a burr generated in each of the bust forging step S103, the rough forging step S104, and the finish forging step S105. As the pre-working step S101, a roll forming step of producing a stepped raw material (not shown) from the rod-like raw material 20 by stepwise varying the outer diameter thereof along the axial direction is preferably performed. The roll forming step includes heating the rod-like raw material 20 in a heating furnace or the like, and then stepwise varying the outer diameter of the heated rod-like raw material 20 along the axial direction using a conventionally known roll forming machine.

What is claimed is:

1. A bending die used in an apparatus for manufacturing an automotive suspension arm to bend an elongated raw material transported therein with a transport system and produce a bent material, comprising:

a lower bending die having an upper surface, longitudinal sides separated from each other in a longitudinal direction, and lateral sides extending at least partially between said longitudinal sides, the lower bending die including two support grooves extending into the lower bending die from a portion of the upper surface, the support grooves further extending generally in the longitudinal direction for mounting the elongated raw material during bending, the lower bending die further including an access groove extending into the lower bending die from the upper surface, in a middle portion of the lower bending die, so as to divide the two support grooves from each other, wherein the access groove extends transverse to the two support grooves and extends deeper into the lower bending die than the two support grooves, so as to provide access for the transport system to grip the bent material; and an upper bending die including a pressing portion whose shape in the longitudinal direction corresponds to that of the portion of the upper surface having the two support grooves, wherein the pressing portion is able to vertically press the elongated raw material mounted in a the support groove of the lower bending die.

2. A bending die according to claim 1, wherein the upper die has a contact portion including, in a middle portion thereof, a non-contact portion which does not come in contact with the bent material.

3. An apparatus for manufacturing an automotive suspension arm using the bending die according to claim 2, comprising:
   at least one forging device in which the bending die, a bust forging die that forges the bent material formed with the bending die to produce a bust forged material, and a finish forging die that forges the bust forged material to produce a finish forged material are juxtaposed;
   a trimming device that trims a burr portion of the finish forged material; and
   a transport system, wherein the transport system transports the elongated raw material onto the bending die, transports the bent material to the bust forging die, transports the bust forged material to the finish forging die, and transports the finish forged material out of the forging device to the trimming device.

4. An apparatus for manufacturing the automotive suspension arm according to claim 3, wherein the transport system includes:
   a first transport device that transports the elongated raw material onto the bending die, and transports the bent material to the bust forging die;
   a second transport device that transports the bust forged material to the finish forging die; and
   a third transport device that transports the finish forged material out of the forging device to the trimming device.

5. An apparatus for manufacturing the automotive suspension arm according to claim 3, wherein, in the forging device, a rough forging die that forges the bust forged material to produce a rough forged material is further juxtaposed, and, in the finish forging die, the rough forged material is forged to produce the finish forged material, and the transport system transports the bust forged material to the rough forging die, and transports the rough forged material to the finish forging die.

6. A method for manufacturing the automotive suspension arm using the manufacturing apparatus according to claim 5, comprising:
   vertically pressing the elongated raw material to bend the elongated raw material using the bending die and produce the bent material;
   forging the bent material using the bust forging die to produce the bust forged material;
   forging the bust forged material using the rough forging die to produce the rough forged material;
   forging the rough forged material using the finish forging die to produce the finish forged material; and
   trimming a burr portion of the finish forged material using the trimming device to manufacture the automotive suspension arm.

7. A method for manufacturing an automotive suspension arm using the manufacturing apparatus according to claim 3, comprising:
   vertically pressing the elongated raw material to bend the elongated raw material using the bending die and produce the bent material;
   forging the bent material using the bust forging die to produce the bust forged material;
   forging the bust forged material using the finish forging die to produce the finish forged material; and
   trimming a burr portion of the finish forged material using the trimming device to manufacture the automotive suspension arm.

8. An apparatus for manufacturing an automotive suspension arm using the bending die according to claim 1, comprising:
   at least one forging device in which the bending die, a bust forging die that forges the bent material formed with the bending die to produce a bust forged material, and a finish forging die that forges the bust forged material to produce a finish forged material are juxtaposed;
   a trimming device that trims a burr portion of the finish forged material; and
   a transport system, wherein the transport system transports the elongated raw material onto the bending die, transports the bent material to the bust forging die, transports the bust forged material to the finish forging die, and transports the finish forged material out of the forging device to the trimming device.

9. An apparatus for manufacturing the automotive suspension arm according to claim 8, wherein the transport system includes:
   a first transport device that transports the elongated raw material onto the bending die, and transports the bent material to the bust forging die;
   a second transport device that transports the bust forged material to the finish forging die; and
   a third transport device that transports the finish forged material out of the forging device to the trimming device.

10. A method for manufacturing an automotive suspension arm using the manufacturing apparatus according to claim 9, comprising:
   vertically pressing the elongated raw material to bend the elongated raw material using the bending die and produce the bent material;
   forging the bent material using the bust forging die to produce the bust forged material;
   forging the bust forged material using the finish forging die to produce the finish forged material; and
   trimming a burr portion of the finish forged material using the trimming device to manufacture the automotive suspension arm.

11. An apparatus for manufacturing the automotive suspension arm according to claim 8, wherein, in the forging device, a rough forging die that forges the bust forged material to produce a rough forged material is further juxtaposed, and, in the finish forging die, the rough forged material is forged to produce the finish forged material, and the transport system transports the bust forged material to the rough forging die, and transports the rough forged material to the finish forging die.

12. A method for manufacturing the automotive suspension arm using the manufacturing apparatus according to claim 11, comprising:
   vertically pressing the elongated raw material to bend the elongated raw material using the bending die and produce the bent material;
   forging the bent material using the bust forging die to produce the bust forged material;
   forging the bust forged material using the rough forging die to produce the rough forged material;
   forging the rough forged material using the finish forging die to produce the finish forged material; and
   trimming a burr portion of the finish forged material using the trimming device to manufacture the automotive suspension arm.

13. A method for manufacturing an automotive suspension arm using the manufacturing apparatus according to claim 8, comprising:
- vertically pressing the elongated raw material to bend the elongated raw material using the bending die and produce the bent material;
- forging the bent material using the bust forging die to produce the bust forged material;
- forging the bust forged material using the finish forging die to produce the finish forged material; and
- trimming a burr portion of the finish forged material using the trimming device to manufacture the automotive suspension arm.

* * * * *